United States Patent

Higuma

(10) Patent No.: US 6,856,764 B2
(45) Date of Patent: Feb. 15, 2005

(54) CAMERA, LENS APPARATUS, AND CAMERA SYSTEM

(75) Inventor: Kazuya Higuma, Tokyo (JP)

(73) Assignee: Canon Kabushiki Kaisha (JP)

( * ) Notice: Subject to any disclaimer, the term of this patent is extended or adjusted under 35 U.S.C. 154(b) by 61 days.

(21) Appl. No.: 10/649,856

(22) Filed: Aug. 26, 2003

(65) Prior Publication Data

US 2004/0037548 A1 Feb. 26, 2004

(30) Foreign Application Priority Data

Aug. 26, 2002 (JP) ........................................ 2002-246002

(51) Int. Cl.[7] .............................................. G03B 13/36
(52) U.S. Cl. ............................. 396/79; 396/91; 396/133; 348/347
(58) Field of Search ................................ 396/79–83, 91, 396/93, 133–135; 359/822, 823; 348/345, 347

(56) References Cited

U.S. PATENT DOCUMENTS 4,509,841 A * 4/1985 Sakai et al. .................... 396/93
5,839,002 A * 11/1998 Miyake et al. ................. 396/91
5,887,201 A * 3/1999 Maeno ........................... 396/86

FOREIGN PATENT DOCUMENTS

JP          7-77648          3/1995          ............ G02B/7/08

* cited by examiner

Primary Examiner—W. B. Perkey
(74) Attorney, Agent, or Firm—Morgan & Finnegan, LLP

(57) ABSTRACT

A camera which drives a focusing lens to a target position in a short period of time while maintaining required stop accuracy in accordance with the status of an image-taking optical system, is disclosed. The camera comprises the image-taking optical system and a pulse generator that outputs pulse signals in accordance with movement of the focusing lens. A stop judging unit selectively carries out, in accordance with the status of the image-taking optical system, a first stop judgement of the focusing lens by detecting that the count value of pulse signals has reached a target count value, and a second stop judgement of the focusing lens by detecting that the output signal from the pulse generator does not change.

22 Claims, 13 Drawing Sheets

CAMERA, LENS APPARATUS, AND CAMERA SYSTEM

BACKGROUND OF THE INVENTION

1. Field of the Invention

The present invention relates to a camera having a focus adjusting function and a lens apparatus adapted to the focus adjusting function.

2. Description of Related Art

Conventionally, a number of cameras with focus adjusting functions and lens apparatuses adapted to the focus adjusting functions have been commercialized. These products automatically focus on an object by measuring the distance to the object or detecting a defocus amount of an image-taking optical system with a focus detecting unit and driving a focusing lens.

In focusing lens control in the above-mentioned products, in order to improve focusing accuracy, high stop position accuracy is required. To obtain high stop position accuracy, it is necessary to stop the focusing lens at a low speed. Therefore, it is generally difficult to complete focusing in a short period.

Various methods for increasing the speed of driving the focusing lens have been achieved to solve this problem. For example, in an image-taking lens the focal length of which is variable, such as a zoom lens, by using the focal depth that becomes deep at the wide-angle side and becomes shallow at the telephoto side, the focusing lens is driven at a high speed at the wide-angle side and driven at a low speed at the telephoto side.

However, in this case, since the final stop position accuracy of the focusing lens is uniformly set to the highest stop accuracy required at the telephoto side, the period of stopping the focusing lens cannot be sufficiently reduced even at the wide-angle side at which high-speed driving is allowed.

Furthermore, the focal depth is also changed by setting of the aperture diameter of a diaphragm, the stop position accuracy of the focusing lens can be eased when the aperture diameter of the diaphragm is small. A method for controlling the stop position of a focusing lens by detecting the state of a diaphragm has been proposed in Japanese Laid-Open No. H07-77648. The purpose of this proposal is power savings, which does not lead to an increase in the speed of automatic focusing.

SUMMARY OF THE INVENTION

An object of the invention is to provide a camera, a lens apparatus, and a camera system, which can drive a focusing lens to a target position in a short period while maintaining required stop accuracy according to the state of an image-taking optical system.

According to one aspect of the present invention to achieve the abovementioned object, a camera and a lens apparatus, comprises an image-taking optical system including a focusing lens which is movable in an optical axis direction for focusing, a drive unit which drives the focusing lens to a target position, a pulse generator which outputs pulse signals in accordance with the movement of the focusing lens, and a stop judging unit which judges that the focusing lens has stopped at the target position based on the pulse signals from the pulse generator.

Further, the stop judging unit selects and makes a first stop judgement that the focusing lens has stopped at the target position when the count value of the pulse signals from the pulse generator reaches a count value corresponding to the target position, and a second stop judgement that the focusing lens has stopped at the target position when an output signal does not change from the pulse generator for a predetermined period of time or longer, according to the state of the image-taking optical system.

The characteristics of the camera, the lens apparatus, and the camera system of the invention will become clearer with a description of the specific embodiments below with reference to the attached drawings.

DETAILED DESCRIPTION OF THE PREFERRED EMBODIMENTS (Embodiment 1)

Figure 1:
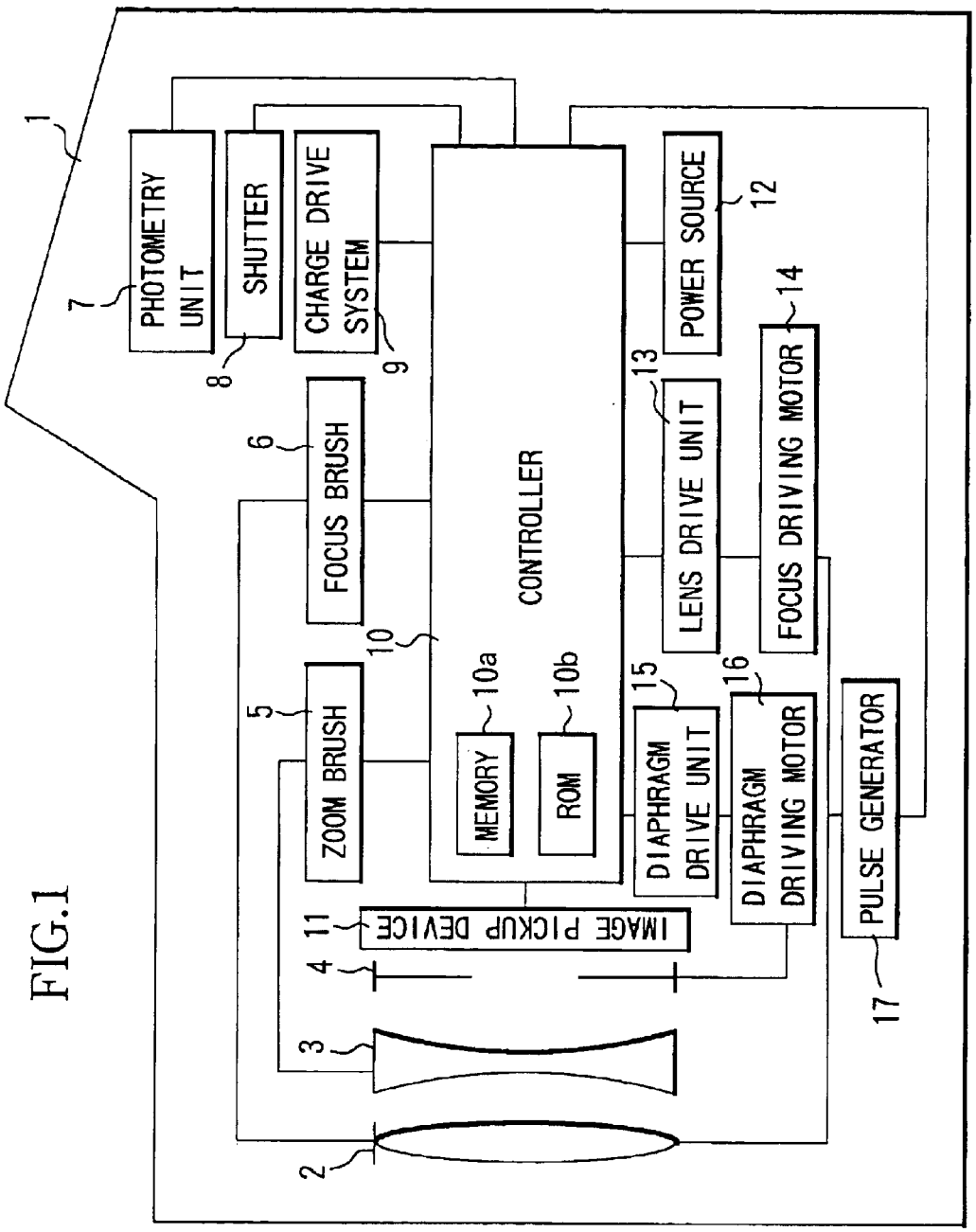
FIG. 1 is a block diagram showing the structure of a camera of Embodiment 1 of the present invention.

FIG. 1 shows the structure of the camera of Embodiment 1 of the present invention. The reference numeral 1 denotes a camera. In the camera 1, the reference numeral 2 denotes a focusing lens, 3 denotes a zooming lens, 4 denotes a diaphragm (stop). The camera 1 has an image-taking optical system including these focusing lens 2, zooming lens 3, and diaphragm 4.

A zoom brush 5 slides on a resistor that is not shown in accordance with movement of the zooming lens 3 for detecting the position of the zooming lens 3, and outputs a signal of a voltage value corresponding to the position of the zooming lens 3. A focus brush 6 slides on a resistor that is not shown in accordance with movement of the focusing lens 2 for detecting the position (zone) of the focusing lens 2, and outputs a signal of a voltage value corresponding to the position of the focusing lens 2. These brushes 5 and 6 are electrically connected to a controller 10 that is described later.

A photometry unit 7 measures the amount of light that has passed through the image-taking optical system, and a shutter 8 controls exposure onto an image pickup device (photoelectric converting element) 11 such as a CCD or CMOS sensor. A charge drive system 9 carries out charge driving of the shutter 8. The photometry unit 7, the image pickup device 11, the shutter 8, and the charge drive system 9 are electrically connected to the controller 10 that is described later.

A controller 10 governs various controls within the camera 1, and comprises a CPU or an MPU. The controller 10 also serves as a focus detecting unit which detects the focusing state of the image-taking optical system (hereinafter, referred to as focus detection) based on signals obtained through photoelectric conversion in at least two image pickup areas in the image pickup device 11 with Phase Difference Detecting Method or the like, and as a stop judging unit which judges that the focusing lens 2 has stopped at an in-focus position that is a target position.

The image pickup device 11 photoelectrically converts an object image formed by the image-taking optical system. Output signals from the image pickup device 11 are converted into image signals by being subjected to various processings by the controller 10, and the image signals are recorded on a recording medium (semiconductor memory, magnetic disk, or optical disk, etc.) that is not shown.

The reference numeral 12 denotes a power source, 13 denotes a lens drive unit which drives a focus driving motor 14 in response to an command signal from the controller 10, and 15 denotes a diaphragm drive unit which drives a diaphragm driving motor 16 in response to an command signal from the controller 10.

Furthermore, the camera 1 of this embodiment is provided with a pulse generator 17 which generates pulse signals in accordance with movement of the focusing lens 2. In detail, the pulse generator 17 comprises a pulse plate (not shown) formed by forming a plurality of slits in a disk that rotates in accordance with movement of the focusing lens 2, and a photointerrupter (not shown) which generates pulse signals by detecting light that has penetrated the slits in response to rotation of the pulse plate. Not limited to the photointerrupter, a photoreflector or a magnetic sensor that generates pulse signals by magnetically detecting movement of the focusing lens 2 may also be used.

Next, automatic focus adjusting operation of the camera (primarily, controller 10) of this embodiment is described with reference to the flowcharts of FIG. 2 through FIG. 5. In FIG. 2 through FIG. 5, portions attached with the same circled number are connected to each other.

<Step 101>

Focus adjusting operation of the controller 10 starts when an image-taking preparation switch provided on the camera 1, that is not shown, is turned on.

<Step 102>

First, the controller 10 carries out focus detection of the image-taking optical system as mentioned above.

<Step 103>

Next, the controller 10 calculates a defocus amount of the image-taking optical system from a result of focus detection at Step 102.

<Step 104>

The controller 10 calculates a driving amount of the focusing lens 2 to an in-focus position (target position) based on the defocus amount obtained at Step 103. This driving amount is calculated as an amount of pulse signals generated by the pulse generator 17. Also, this driving amount is stored as FOPC in a memory 10a inside the controller 10.

<Step 105>

The controller 10 reads in a current count value of pulse signals outputted from the pulse generator 17, and stores it as FPCO in the memory 10. Herein, the pulse signals outputted from the pulse generator 17 are counted by the controller 10 so as to be read in as a pulse count value.

Furthermore, the controller 10 has a pulse width measuring timer for measuring the period from rise to fall of a pulse signal and the period from fall to the next rise of a pulse signal, that is, a period during which the output signal from the pulse generator 17 does not change.

<Step 106>

The controller 10 reads in data that shows a target driving speed of the focusing lens 2, stored in a ROM 10b inside the controller 10 in advance. For the target driving speed, a predetermined value is stored as the pulse width (T-SPD) of the pulse signals to be generated from the pulse generator 17 according to the object brightness and the focal length of the image-taking optical system.

<Step 107>

Then, the controller 10 outputs a control signal to the lens drive unit 13, drives the focus driving motor 14, and starts driving the focusing lens 2.

<Step 108>

The controller judges whether or not a pulse signal has been inputted from the pulse generator 17. If a pulse signal has been inputted, the process progresses to Step 109, otherwise, the process progresses to Step 120.

<Step 109>

Since it has been judged in Step 108 that a pulse signal has been inputted, the pulse count value showing the current position of the focusing lens 2 changes. Then, the controller 10 acquires a pulse count value FPC showing the current position.

<Step 110>

Since a pulse signal has been inputted in Step 108, the controller 10 reads in a measured value of pulse width (R-SPD) showing the current driving speed (actual driving speed).

<Step 111>

The controller 10 resets the value of the pulse width measuring timer, and restarts it so that a pulse width measured value indicating the current driving speed is obtained when the next pulse signal is inputted.

<Step 112>

The controller 10 checks an in-stop-process flag, and when the in-stop-process is set, it is judged that the operation is in the middle of stop processing and the process returns to Step 108, and when the flag is reset, the process progresses to Step 113.

<Step 113>

The controller 10 judges whether or not the remaining driving amount to the target position (FOPC+FPCO)−FPC is equal to or less than a predetermined number of deceleration pulses. If it is equal to or less than the predetermined number of deceleration pulses, the process progresses to Step 114, otherwise, the process progresses to Step 115.

Figure 6:
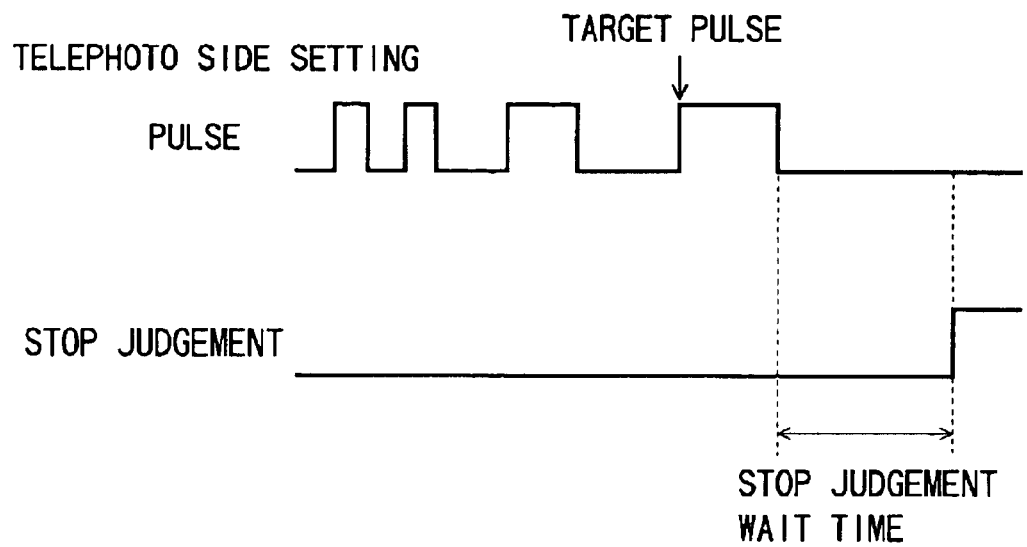
FIG. 6(A) is a diagram describing stop judgement at the telephoto side in Embodiment 1.
FIG. 6(B) is a diagram describing stop judgement at the wide-angle side.
Figure 6:
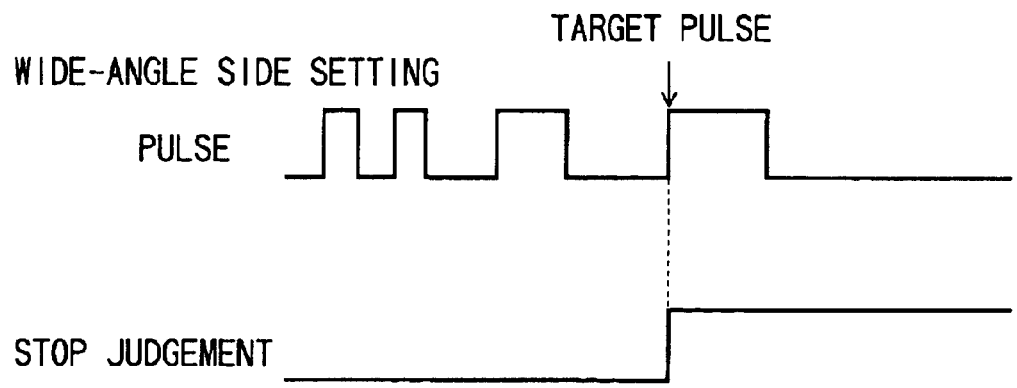
Figure 7:
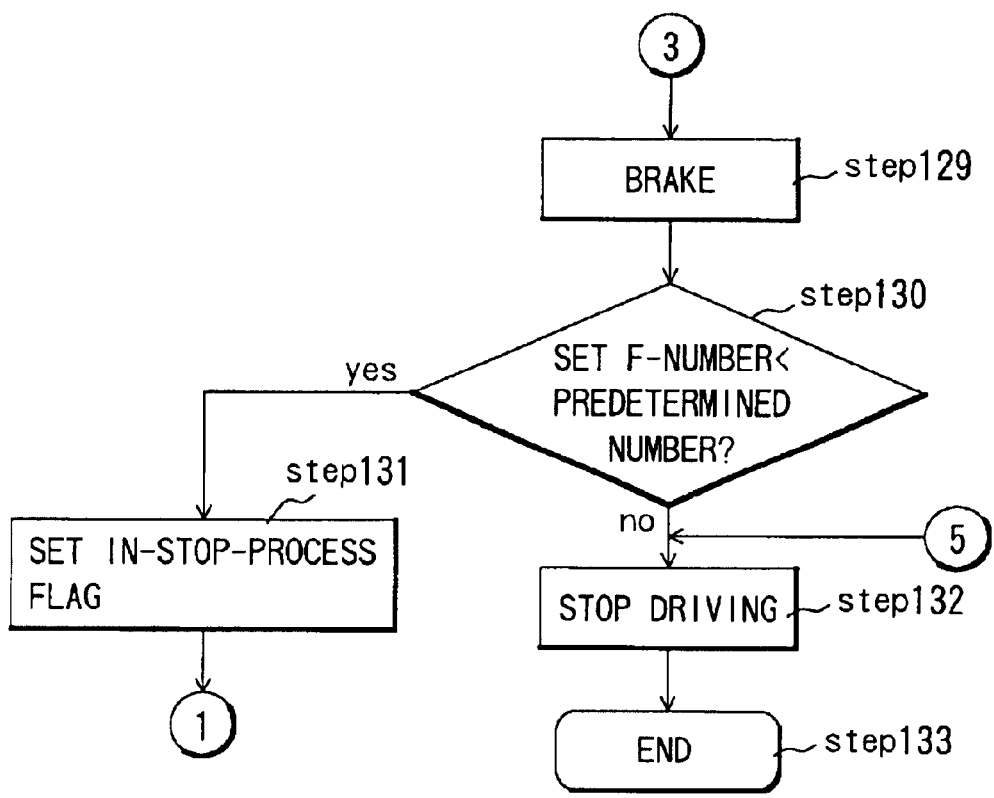
FIG. 7 is a flowchart describing processing of a camera of Embodiment 2 of the present invention.

Herein, the number of deceleration pulses is an amount of driving by which the focusing lens 2 can be decelerated and stopped at the target position corresponding to the target pulse shown in FIG. 6(A) and FIG. 6(B), and which was determined in advance and has been stored in the ROM 10b.

<Step 114>

Since it has been judged at Step 113 that the remaining driving amount is equal to or less than the number of deceleration pulses, to change the target driving speed, the controller 10 acquires a driving speed (T-SPD) to be set as a new target speed. Thereby, when the remaining driving amount becomes equal to or less than the number of deceleration pulses, the target driving speed is changed so that the focusing lens 2 is stopped at the target position while being gradually decelerated.

<Step 115>

The controller 10 compares R-SPD that has been acquired at Step 110 and indicates the current driving speed with T-SPD indicating the target driving speed, and when R-SPD is larger than T-SPD, the process progresses to Step 117, otherwise, the process progresses to Step 116.

Herein, R-SPD and T-SPD are pulse width data, so that R-SPD being larger than T-SPD means that the current driving speed is lower than the target driving speed.

<Step 116>

The controller 10 compares R-SPD and T-SPD, and when R-SPD is smaller than T-SPD, the process progresses to Step 118, otherwise, the process returns to Step 108.

<Step 117>

Since it has been judged at Step 115 that the current driving speed is lower than the target driving speed, the controller 10 carries out speed-up processing to increase the driving speed of the focusing lens 2.

Herein, although it depends on the type of the focus driving motor, in a case where a DC motor is used as the focus driving motor 14, the speed-up processing increases or decreases the speed by controlling the voltage to be applied to the DC motor. In this case, the driving speed is increased by increasing the voltage to be applied to the focus driving motor 14.

In greater detail, when the current driving speed is compared with the target driving speed at Step 115, the difference between these is stored, and an amount of increasing the voltage is determined according to the difference, and then the voltage is increased by this amount. Namely, the larger the difference from the target driving speed, the larger the amount of increasing the voltage. Thereby, the actual driving speed can be made to more quickly reach the target driving speed. Furthermore, when short-braking or reverse-braking for deceleration, the above processing is carried out after the brake is released.

For the focus driving motor 14, a vibration type motor may be used.

<Step 118>

Since it has been judged at Step 116 that the current driving speed is higher than the target driving speed, the controller 10 carries out speed-down processing to reduce the driving speed of the focusing lens 2.

Herein, the speed is reduced by lowering the voltage to be applied to the focus driving motor 14 that is a DC motor, or by applying short-braking or reverse-braking.

In greater detail, when the current driving speed is compared with the target driving speed at Step 116, the difference between these is stored, and it is determined based on the difference as to whether braking is applied or the voltage is lowered. When the voltage is lowered, an amount of lowering the voltage is determined based on the difference. Namely, in a case where the difference from the target driving speed is large, the speed is suddenly reduced by braking, and when the difference is small, the amount of lowering the voltage is increased as the difference increases. Thereby, the actual driving speed can be more quickly reduced to the target driving speed.

Short-braking is a method for quickly stopping the motor by short-circuiting between the positive and negative terminals of the motor and using the power generation action (back EMF voltage) of the motor. Reverse-braking is a method for quickly stopping the motor by forcibly supplying a current in an opposite direction between the terminals of the motor.

<Step 119>

The controller 10 judges whether or not the remaining driving amount (FOPC+FPCO)−FPC is 0, that is, whether or not the count value of pulse signals from the pulse generator 17 has reached the count value of the target pulse shown in FIG. 6(A) and FIG. 6(B). When the remaining driving amount is 0, the process progresses to Step 124, otherwise, the process returns to Step 108.

<Step 120>

The controller 10 reads in R-TIM that is a current value of the pulse width measuring timer. This R-TIM indicates a period of time from the previous pulse input (fall of pulse signal) to the present.

<Step 121>

The controller 10 checks an in-stop-process flag, and when the in-stop-process flag is set, the controller 10 judges that the operation is in the middle of stop processing, and the process progresses to Step 122, and when the flag is reset, the process progresses to Step 123.

<Step 122>

Since the middle of the stop processing has been judged at Step 121, the controller 10 compares R-TIM and STOP-TIM. STOP-TIM indicates a period of continuity of a condition where the output signal from the pulse generator 17 does not change, which was determined in advance and has been stored in the memory 10a for judgement of stoppage of the focusing lens 2 (focus driving motor 14).

When R-TIM is shorter than STOP-TIM, the process returns to Step 108 and waits for an input of a pulse signal, and when R-TIM is equal to or longer than STOP-TIM, the process progresses to Step 127.

<Step 123>

Since it has been judged that the operation is still in the middle of focusing lens driving, the controller 10 compares R-TIM and UP-TIM. UP-TIM indicates a period of continuity of a condition where the output signal from the pulse generator 17 does not change, which was determined in advance and has been stored in the memory 10a for preventing the speed from excessively lowering and resulting in stoppage even though the operation is in the middle of driving (namely, not in the middle of stop processing).

When R-TIM is shorter than UP-TIM, the process returns to Step 108 and waits for an input of a pulse signal, and when R-TIM is equal to or longer than UP-TIM, the process progresses to Step 117 and carries out speed-up processing.

<Step 124>

Since the remaining driving amount has reached 0 and the focusing lens 2 has reached the target position, the controller 10 applies braking (short-braking or reverse-braking) to the focus driving motor 14.

<Step 125>

The controller 10 reads in a voltage value outputted from the zoom brush 6, and judges whether or not the current position ZOOM of the zooming lens 3 is equal to or larger than a predetermined value. Herein, the predetermined value corresponds to a focal length that was determined in advance, and the position of the zooming lens 3 larger than the predetermined value proves that the focal length of the image-taking optical system is more on the telephoto side than the focal length corresponding to the predetermined value. Furthermore, the position of the zooming lens 3 smaller than the predetermined value proves that the focal length of the image-taking optical system is more on the wide-angle side than the focal length corresponding to the predetermined value.

The focal length corresponding to the predetermined value is required to be a value at which even though the focusing lens 2 overruns the target position, a defocus amount on the image pickup surface due to the overrun does not exceed a permissible circle of confusion diameter.

When the current position ZOOM of the zooming lens 3 is larger (telephoto side) than the predetermined value, the process progresses to Step 126, and when it is at the wide-angle side, the process progresses to Step 127.

<Step 126>

Since it has been judged at Step 125 that the focal length is on the telephoto side, the controller 10 sets a flag indicating the operation is in the middle of stop processing, and then the process returns to Step 108. From Step 108, the process progresses to Step 120, Step 121, and Step 122. Namely, in a case where the focal length is on the telephoto side, as shown in FIG. 6(A), it is monitored whether or not a pulse signal is inputted from the pulse generator 17 (whether or not the output signal from the pulse generator 17 changes) while braking the focus driving motor 14, and it is confirmed that the focusing lens 2 does not overrun the target position. Then, when it is judged in Step 122 that R-TIM is equal to or longer than STOP-TIM (shown as a stop judgement wait time in FIG. 6(A)), that is, when it is confirmed that the target position is not overrun, the process progresses to Step 127.

In a case where overrun occurs, the amount of overrun (pulse signals from the pulse generator 17) is counted and recognized, and the count value is used for judgement as to whether or not focus detection is carried out again.

<Step 127>

The controller 10 judges that the focusing lens 2 has stopped, and carries out drive stop processing. Herein, when the process directly flows to Step 127 from Step 125 (when the focal length is on the wide-angle side), a first stop judgement is carried out immediately by confirming that the remaining driving amount reaches 0 (the count value of pulse signals from the pulse generator 17 reaches the count value of the target pulse) as shown in FIG. 6(B). On the other hand, in a case where the process flows to Step 127 from Step 125 via Step 126 (Step 108, Step 120, Step 121, and Step 122), that is a case where the focal length is on the telephoto side, a second stop judgement is carried out by confirming that no pulse signal is inputted during the stop judgement wait time (STOP-TIM) after the remaining driving amount reaches 0 as shown in FIG. 6(A).

Furthermore, the controller 10 transfers to the next sequence in which it carries out focus detection again or exposure (image-taking) of the image pickup device 11 upon making the stop judgement of the focusing lens 2.

<Step 128>

The controller ends this focus adjusting processing.

As described above, in this embodiment, the method for judging the drive stop of the focusing lens 2 is switched according to the focal length of the image-taking optical system, stop position accuracy in stopping the focusing lens 2 to the target position (in-focus position) is secured at the telephoto side, and on the other hand, at the wide-angle side, the stop position accuracy is eased to quicken the drive stop and shortens the drive time of the focusing lens 2.

In this embodiment, one focal length is set for switching the stop judgement, however, it is also possible that stop judgement of the focusing lens can be more finely carried out by setting a plurality of focal lengths so that STOP-TIM for the stop judgement (second stop judgement) at the telephoto side differs depending on the focal length. Thus, by setting an optimal STOP-TIM for each focal length, the drive time can be shortened as much as possible while securing stop position accuracy required for each focal length.

(Embodiment 2)

Figure 2:
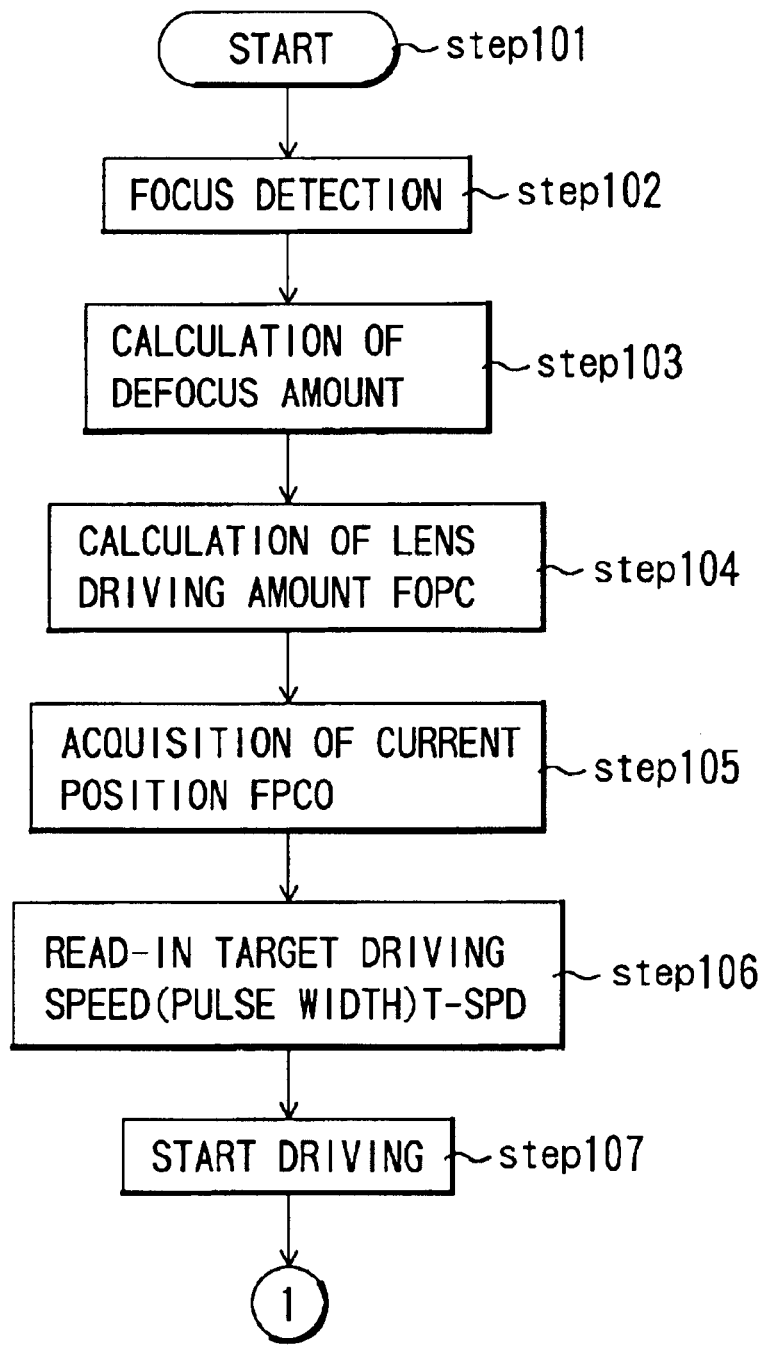
FIG. 2 is a flowchart describing processing operations of the camera of Embodiment 1.
Figure 3:
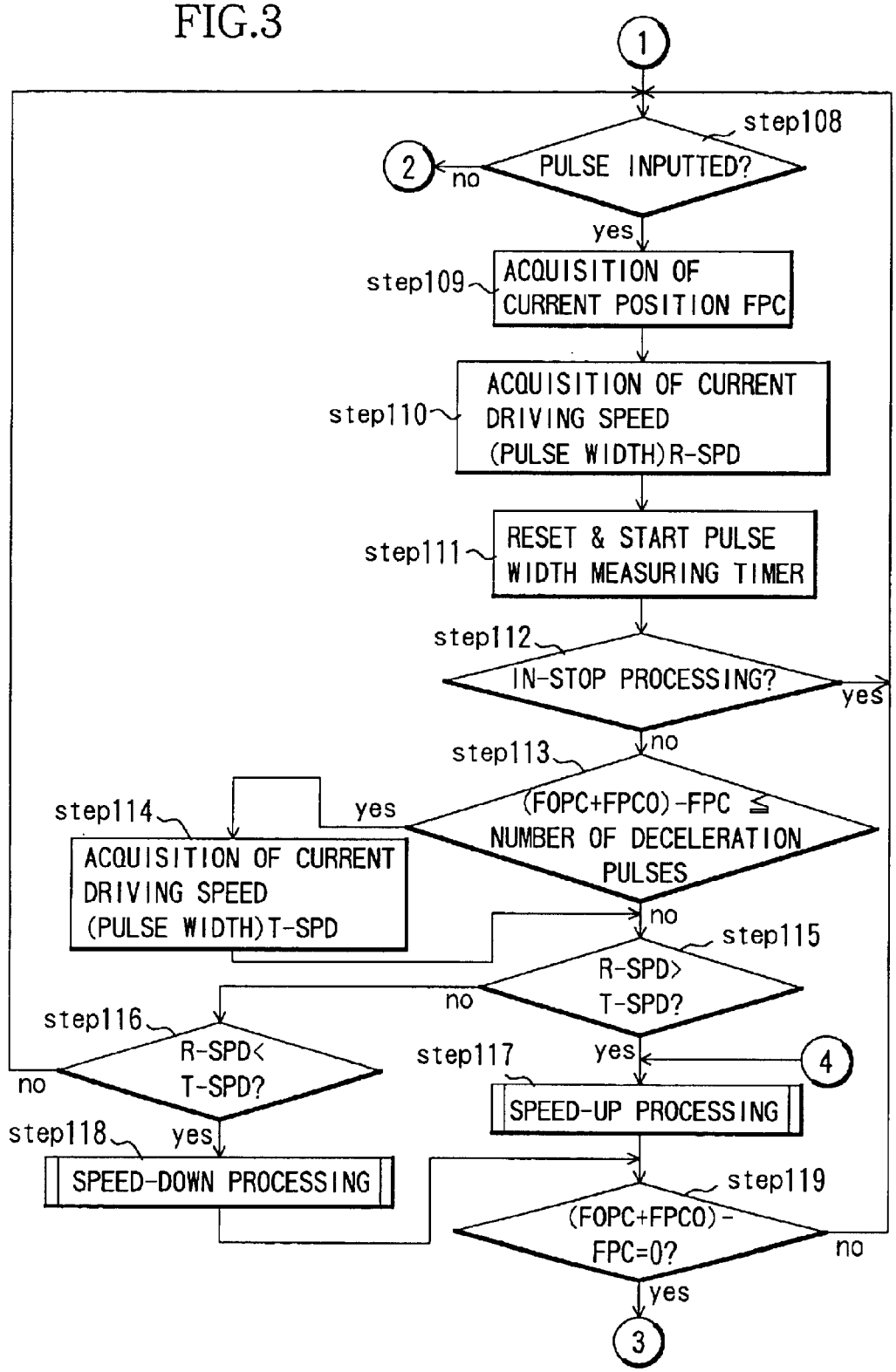
FIG. 3 is a flowchart describing processing operations of the camera of Embodiment 1.
Figure 4:
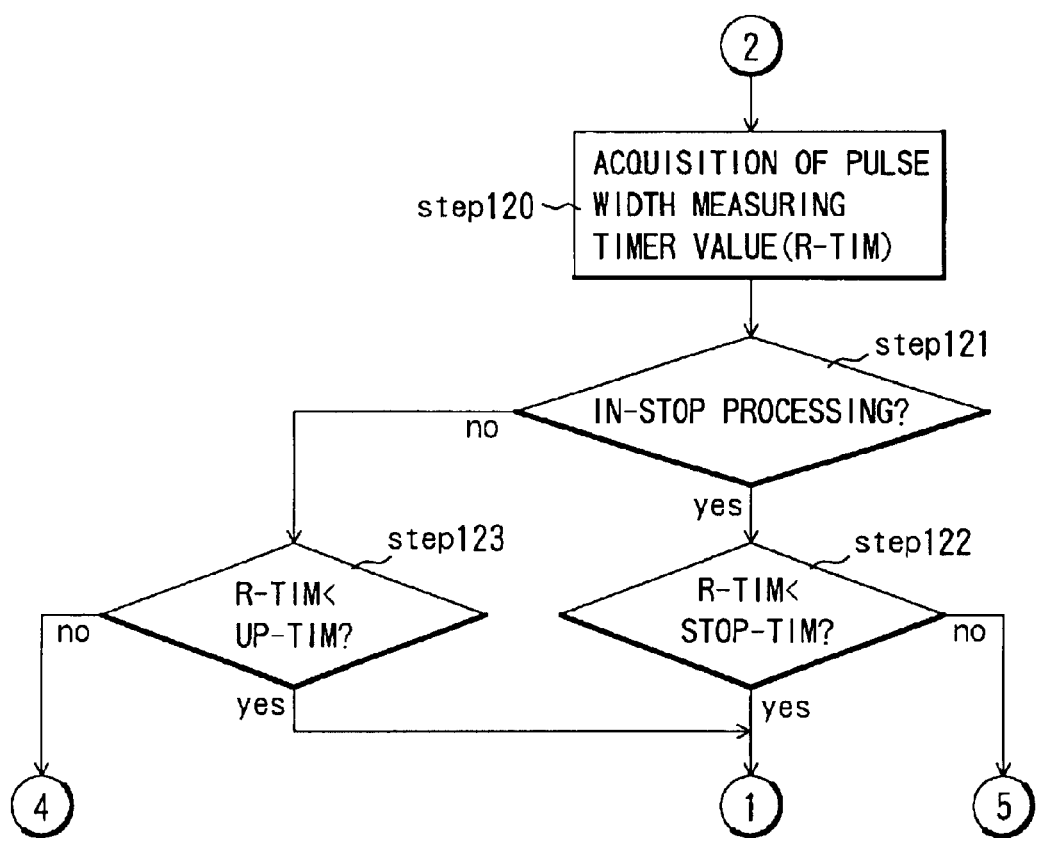
FIG. 4 is a flowchart describing processing operations of the camera of Embodiment 1.
Figure 5:
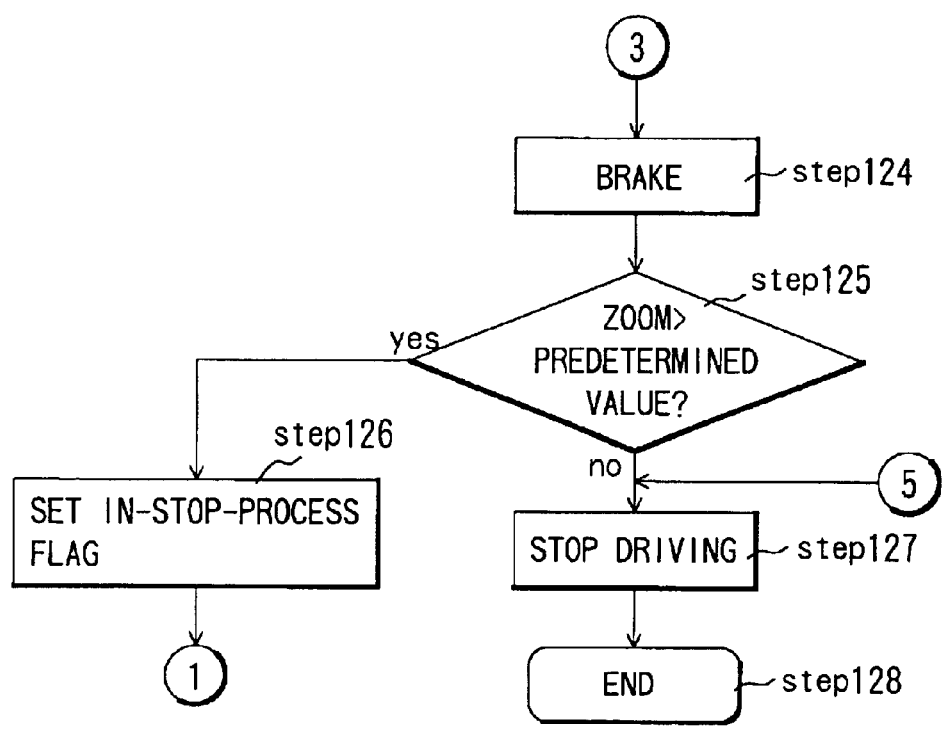
FIG. 5 is a flowchart describing processing operations of the camera of Embodiment 1.

Next, the automatic focus adjusting operation of the camera of Embodiment 2 of the present invention is described with reference to the flowcharts of FIG. 2 through FIG. 4 and FIG. 7. Processings of FIG. 2 through FIG. 4 are omitted since they have been described above, and only the flowchart of FIG. 7 is described here. Portions attached with the same circled number in FIG. 2 through FIG. 4 and FIG. 7 are connected to each other.

Furthermore, the structure of the camera to which this embodiment is applied is the same as that of the camera of Embodiment 1, and description of common components is omitted by attaching the same reference numerals to them.

<Step 129>

Since the remaining driving amount has reached 0 and the focusing lens 2 has reached the target position at Step 119 in FIG. 3, the controller 10 applies braking (short-braking or reverse-braking) to the focus driving motor 14 to stop the focusing lens 2.

<Step 130>

The controller 10 reads in a current set value of the diaphragm 4 (hereinafter, referred to as a set F-number), and judges whether or not the set F-number is equal to or larger than a predetermined number. Herein, the set F-number larger than the predetermined number indicates a condition where the aperture diameter of the diaphragm 4 is narrower than the aperture diameter corresponding to the predetermined number. On the other hand, the set F-number smaller than the predetermined number indicates a condition where the aperture diameter of the diaphragm 4 is larger on the open side than the aperture diameter corresponding to the predetermined number. Then, it is required that the F-number corresponding to the predetermined number is set so that even though the focusing lens 2 overruns the target position, a defocus amount on the image pickup surface due to the overrun does not exceed a permissible circle of confusion diameter.

When the set F-number is smaller (open side) than the predetermined number, the process progresses to Step 131, and when it is equal to or larger (narrowed side) than the predetermined number, the process progresses to Step 132.

<Step 131>

Since it has been judged that the set F-number is at the open side, the controller 10 sets a flag indicating that the operation is in the middle of stop processing, and the process returns to Step 108 in FIG. 3. The process progresses to Step 120, Step 121, and Step 122 from Step 108, and when R-TIM is equal to or longer than STOP-TIM in Step 122 (when it is confirmed that the focusing lens 2 has not overrun the target position), the process progresses to Step 132.

In a case where the focusing lens has overrun, the amount of overrun (pulse signals from the pulse generator 17) is counted and recognized, and the count value is used for judgement as to whether or not focus detection is carried out again.

<Step 132>

The controller 10 judges that the focusing lens 2 has stopped, and carries out drive stop processing. Herein, when the process directly flows to Step 132 from Step 130 (when the set F-number is equal to or larger than the predetermined number, that is, at the narrowed side), a first stop judgement is carried out immediately by confirming that the remaining driving amount reaches 0 (the count value of pulse signals from the pulse generator 17 reaches the count value of the target pulse) as in the case where the focal length is on the wide-angle side shown in FIG. 6(B). On the other hand, when the process flows to Step 132 via Step 131 (Step 108, Step 120, Step 121, and Step 122) from Step 130 (that is, when the set F-number is smaller than the predetermined number, namely, at the open side), a second stop judgement is carried out by confirming that no pulse signal is inputted during the stop judgement wait time (STOP-TIM) after the remaining driving amount reaches 0 as in the case where the focal length is on the telephoto side shown in FIG. 6(A).

Furthermore, after stop judgement of the focusing lens 2, the controller 10 transfers to the next sequence in which it carries out focus detection again and exposure (image-taking operation) of the image pickup device).

<Step 133>

The controller 10 ends this focusing processing.

As described above, in this embodiment, the method for judging drive stop of the focusing lens 2 is switched according to the set value of the diaphragm 4, and at the diaphragm open side, stop position accuracy of the focusing lens 2 to the target position (focusing position) is secured, and at the narrowed side, the stop position accuracy is eased to quicken drive stop and shortens the drive time of the focusing lens 2.

In this embodiment, one value of the diaphragm is set for switching the stop judgement, however, it is also possible that stop judgement of the focusing lens can be more finely carried out by setting a plurality of values of the diaphragm so that STOP-TIM for stop judgement (second stop judgement) at the open side differs depending on the value of the diaphragm. Thus, by setting an optimal STOP-TIM for each value of the diaphragm, the drive time can be shortened as much as possible while securing stop position accuracy required for each set value of the diaphragm.

Furthermore, in Embodiments 1 and 2 described above, a digital camera equipped with the image pickup device 11 is described, however, the present invention can also be applied to a camera which exposes a film.

(Embodiment 3)

Figure 8:
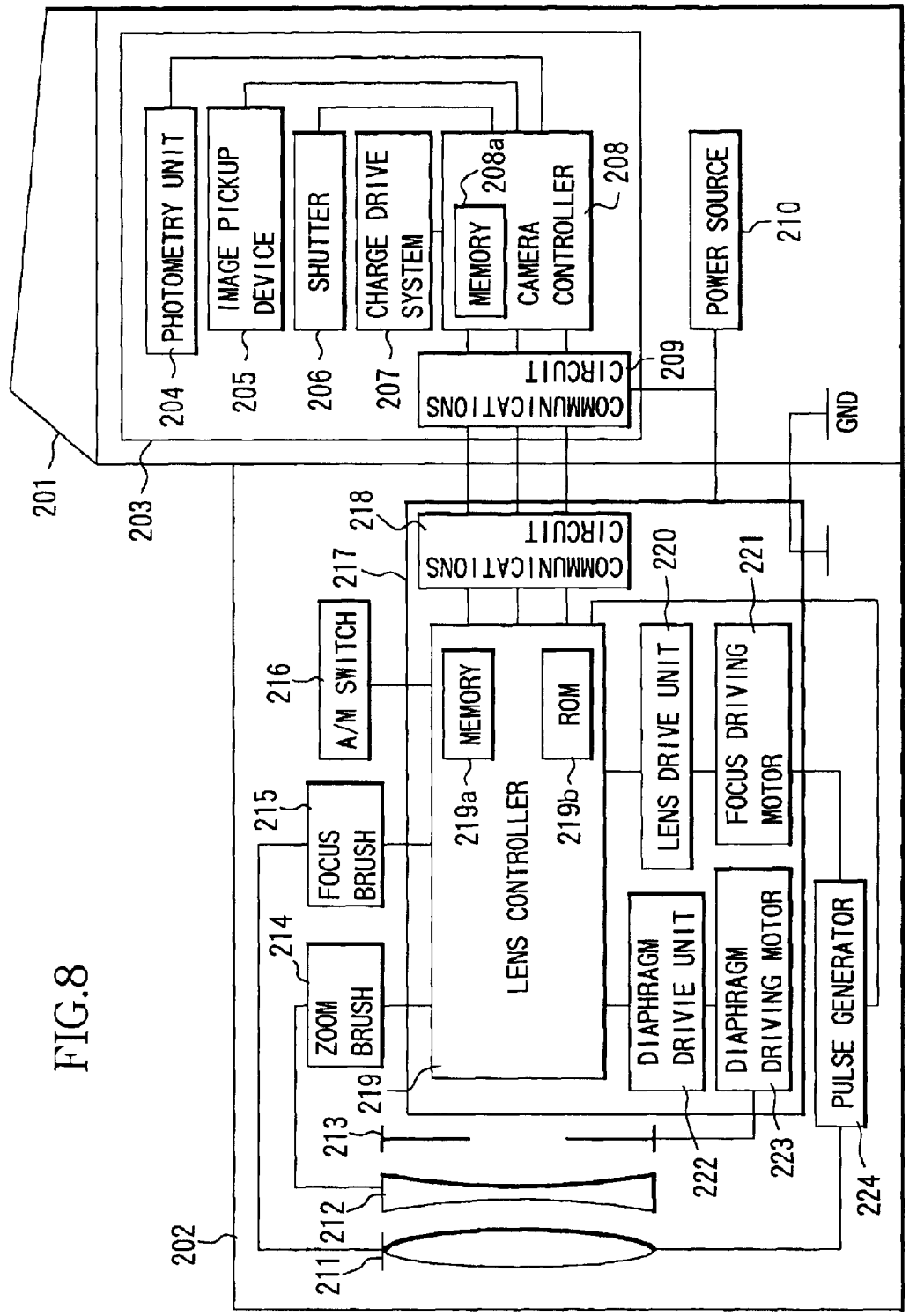
FIG. 8 is a block diagram showing the structure of a camera system of Embodiment 3 of the present invention.

FIG. 8 shows the structure of the camera system of Embodiment 3 of the present invention. In FIG. 8, the reference numeral 201 denotes a camera, and 202 denotes an image-taking lens (lens apparatus) that can be detachably attached to the camera 201.

Inside the camera 201, the reference numeral 203 denotes an electric circuit. In this electric circuit 203, a photometry unit 204 for measuring the amount of light that has penetrated through the image-taking optical system of the image-taking lens 202, an image pickup device 205 which photoelectrically converts an object image formed by the image-taking optical system such as a CCD or CMOS sensor, etc., a shutter 206 for controlling exposure of the image pickup device 205, a charge drive system 207 which carries out charge driving of the shutter 206, a camera controller 208 which governs various controls inside the camera 201, and a communications circuit 209 for serial communications with the image-taking lens 202 are provided.

The photometry unit 204, the image pickup device 205, the shutter 206, the charge drive system 207, and the communications circuit 209 are electrically connected to the camera controller 208.

The camera controller 208 comprises a CPU or an MPU. The camera controller 208 serves as a focus detection unit which detects the focusing state (focus detection) of the image-taking optical system based on signals obtained through photoelectrical conversion in at least two image pickup areas in the image pickup device 205 with Phase Difference Detecting Method or the like.

The image pickup device 205 photoelectrically converts an object image formed by the image-taking optical system.

Output signals from the image pickup device 205 are converted into image signals through various processings at the camera controller 208, and are recorded onto a recording medium (semiconductor memory, magnetic disk, or optical disk, etc.) which is not shown.

Furthermore, a power source 201 is provided inside the camera 201, and the image-taking lens 202 is also supplied with power from this power source 210.

In the image-taking lens 202, the reference numeral 211 denotes a focusing lens, 212 denotes a zooming lens, and 213 denotes a diaphragm (stop).

The image-taking lens 202 has an image-taking optical system including these focusing lens 211, zooming lens 212, and diaphragm 213.

A zoom brush 214 slides on a resistor that is not shown in accordance with movement of the zooming lens 212 to detect the position of the zooming lens 212, and outputs a signal of voltage value corresponding to the position of the zooming lens 212. A focus brush 215 slides on the resistor that is not shown in accordance with movement of the focusing lens 211 to detect the position of the focusing lens 211, and outputs a signal of a voltage value corresponding to the position of the focusing lens 211.

An A/M switch 216 switches auto-focusing and manual focusing. The zoom brush 214, the focus brush 215, and the A/M switch 216 are electrically connected to a lens controller 219 described later.

The reference numeral 217 denotes an electric circuit inside the image-taking lens 201.

In the electric circuit 217, a communications circuit 218 for serial communications with the camera 201, a lens controller 219 which governs controls inside the image-taking lens 202, a lens drive unit 220 which controls, in response to a control signal from the lens controller 219, the drive of a focus driving motor 221 that drives a focusing lens 211, and a diaphragm drive unit 222 which controls, in response to a control signal from the lens controller 219, the drive of the diaphragm driving motor 223 that drives the diaphragm 213 are provided.

The lens controller 219 also serves as a stop judging unit which judges that the focusing lens 211 has stopped at an in-focus position that is a target position.

Furthermore, inside the image-taking lens 202, a pulse generator 224 that outputs pulse signals in accordance with movement of the focusing lens 211 is provided. This pulse generator 224 is similar to the pulse generator 117 described in Embodiment 1.

Next, focus adjusting operation of the camera system of this embodiment is described with reference to the flowcharts of FIG. 9 through FIG. 12.

Processing of the camera side (mainly, the camera controller 208) in the camera system of this embodiment is described with reference to FIG. 9.

<Step 201>

When an image-taking preparation switch provided on the camera 201, that is not shown, is turned on, focusing operation by the camera controller 208 is started.

<Step 202>

First, the camera controller 208 carries out focus detection of the image-taking optical system as mentioned above.

<Step 203>

Next, the camera controller 208 calculates a defocus amount of the image-taking optical system from the results of focus detection obtained at Step 202.

<Step 204>

The camera controller 208 judges whether or not the defocus amount obtained at Step 203 is within an in-focus range. When it is within the in-focus range, the process progresses to Step 209, otherwise, the process progresses to Step 205. Herein, the in-focus range is set to a condition where the defocus amount is in a permissible circle of confusion diameter.

<Step 205>

Based on the defocus amount obtained at Step 203, a driving amount of the focusing lens 211 to the in-focus position (target position) is calculated. This driving amount is calculated as an amount of pulse signals to be generated by the pulse generator 224. This driving amount is stored as FOPC in a memory 208a inside the camera controller 208.

<Step 206>

The camera controller 208 outputs a focus drive command to the image-taking lens 202 to carry out focusing lens drive by the driving amount FOPC calculated at Step 205 by means of communications via the communications circuit 209 on the camera side and the communications circuit 218 on the lens side.

<Step 207>

The camera controller 208 receives status communications of the image-taking lens 202 via the communications circuits 209 and 218. By the lens status communications, the driving status of the focusing lens 211 and the F-number of the diaphragm 213, etc., in the image-taking lens 202 are communicated to the camera 201 side.

<Step 208>

The camera controller 208 judges whether or not the focusing lens 211 is being driven based on the lens status communications carried out at Step 207, and when it is being driven, the process progresses to Step 207, and when it is stopped, the process returns to Step 202.

<Step 209>

Since it has been judged as being within the in-focus range at Step 204, the camera controller 208 carries out focusing processing.

<Step 210>

Processing of the camera side up to the in-focus state is ended.

Thus, at the camera 201 side, focus detection and focusing lens drive are repeated until the defocus amount of the image-taking optical system becomes equal to or less than a predetermined amount.

Subsequently, with reference to FIG. 10 through FIG. 12, processing of the image-taking lens 202 side (mainly, the lens controller 219) is described.

<Step 211>

The lens controller 219 receives a focus drive command from the camera 201 side by means of communications at the abovementioned Step 206.

<Step 212>

The lens controller 219 sets an in-focus-driving flag that is one piece of information to be transmitted to the camera 201 through lens status communications at the abovementioned Step 207. While this flag is set, it is judged that the focusing lens 211 is being driven at the camera 201 side.

<Step 213>

The lens controller 219 stores a focus driving amount (FOPC) to the target position, which has been transmitted from the camera 201 side at Step 211, in a memory 219a inside the lens controller 219.

<Step 214>

The lens controller 219 reads in the current count value of pulse signals outputted from the pulse generator 224 and stores it as FPCO in the memory 219a. At this point, the pulse signals outputted from the pulse generator 224 have been counted by the lens controller 219, and can be read in as a pulse count value.

Furthermore, the lens controller 219 has a pulse width measuring timer for measuring a period from rise to fall of the pulse signal and a period from fall to rise of the next pulse signal, that is, a period during which the output signal from the pulse generator 224 does not change.

<Step 215>

The lens controller 219 judges whether or not a pulse signal has been inputted from the pulse generator 224. If a pulse signal has been inputted, the process progresses to Step 216, otherwise, the process progresses to Step 227.

<Step 216>

Since it has been judged at Step 215 that a pulse signal has been inputted, the pulse count value indicating the current position changes. Then, the lens controller 219 acquires a pulse count value FPC showing the current position.

<Step 217>

Since a pulse signal has been inputted at Step 215, the lens controller 219 reads in a pulse width measured value (R-SPD) showing the current driving speed (actual driving speed).

<Step 218>

The lens controller 219 resets the value of the pulse width measuring timer and restarts it so that a pulse width measured value showing the current driving speed can be acquired when the next pulse signal is inputted.

<Step 219>

The lens controller 219 checks an in-stop-process flag, and when the in-stop-process flag is set, it is judged that the operation is in the middle of stop processing and the process returns to Step 215, and when the flag is reset, the process progresses to Step 220.

<Step 220>

The lens controller 219 judges whether or not the remaining driving amount to the target position (FOPC+FPCO)−FPC is equal to or less than a predetermined number of deceleration pulses. If it is equal to or less than the predetermined number of deceleration pulses, the process progresses to Step 221, otherwise, the process progresses to Step 222.

Herein, the number of deceleration pulses corresponds to an amount of driving by which the focusing lens 2 can be decelerated and stopped at the target position corresponding to the target pulse shown in FIGS. 6(A) and 6(B), and is predetermined and stored in a ROM 219b in the lens controller 219.

<Step 221>

Since it has been judged at Step 220 that the remaining driving amount is equal to or less than the number of deceleration pulses, in order to change the target driving speed, the lens controller 219 acquires a new target driving speed (T-SPD). Thereby, when the remaining driving amount becomes equal to or less than the number of deceleration pulses, the target driving speed is changed so that the focusing lens 211 is gradually decelerated and stopped at the target position.

<Step 222>

The lens controller 219 compares R-SPD indicating the current driving speed acquired at Step 217 and T-SPD indicating the target driving speed, and when R-SPD is larger than T-SPD, the process progresses to Step 224, otherwise, the process progresses to Step 223.

Herein, R-SPD and T-SPD are pulse width data, and R-SPD larger than T-SPD means that the current driving speed is lower than the target driving speed.

<Step 223>

The lens controller 219 compares R-SPD and T-SPD, and if R-SPD is smaller than T-SPD, the process progresses to Step 225, otherwise, the process returns to Step 215.

<Step 224>

Since it has been judged at Step 222 that the current driving speed is lower than the target driving speed, the lens controller 219 executes speed-up processing to increase the driving speed of the focusing lens 211.

Herein, although it differs depending on the type of the focus driving motor, in a case where a DC motor is used as the focus driving motor 221, the speed-up processing is to increase or decrease the speed by controlling a voltage to be applied to the DC motor. In this case, the driving speed is increased by increasing the voltage applied to the focus driving motor 221.

In greater detail, when the current driving speed and the target driving speed is compared with each other at Step 222, the difference between these is stored, and the amount of increasing the voltage is determined according to the difference, and then the voltage is increased by this amount. Thereby, the actual driving speed can be made to more quickly reach the target driving speed. During short-braking or reverse-braking for deceleration, the brake is released and then the abovementioned processing is executed.

Furthermore, a vibration type motor may be used as the focus driving motor 221.

<Step 225>

Since it has been judged in Step 223 that the current driving speed is faster than the target driving speed, the lens controller 219 carries out speed-down processing to lower the driving speed of the focusing lens 211.

Herein, the speed is lowered by lowering the voltage to be applied to the focus driving motor 221 that is a DC motor, or by applying short-braking or reverse-braking.

In greater detail, when the current driving speed and the target driving speed are compared with each other at Step 223, the difference between these is stored, and according to the difference, it is determined whether the brake is applied or the voltage is lowered, and in a case where the voltage is lowered, the amount of lowering the voltage is determined according to the difference, and then the voltage is lowered by this amount. Namely, when the difference from the target driving speed is high, the speed is suddenly lowered by braking, and when the difference is small, the amount of lowering the voltage is increased as the difference increases. Thereby, the actual driving speed can be more quickly lowered to the target driving speed.

<Step 226>

The lens controller 219 judges whether or not the remaining driving amount (FOPC+FPCO)−FPC equals 0, that is, whether or not the count value of pulse signals from the pulse generator 224 has reached the count value of the target pulse shown in FIGS. 6(A) and 6(B). If the remaining driving amount is 0, the process progresses to Step 227, otherwise, the process returns to Step 215.

<Step 227>

The lens controller 219 reads in R-TIM that is the current value of the pulse width measuring timer. This R-TIM indicates a period from the previous pulse input (fall of pulse signal) to the present.

<Step 228>

The lens controller 219 checks an in-stop-process flag, and when the in-stop-process flag is set, it is judged that the operation is in the middle of stop processing and the process progresses to Step 229, and when the flag is reset, the process progresses to Step 230.

<Step 229>

Since it has been judged at Step 228 that the operation is in the middle of stop processing, the lens controller 219 compares R-TIM and STOP-TIM. STOP-TIM indicates a period of continuity of a condition where the output signal from the pulse generator 224 does not change, which was predetermined and has been stored in the memory 219a for judgement that the focusing lens 211 (focus driving motor 221) has stopped.

If R-TIM is shorter than STOP-TIM, the process returns to Step 215 and waits for an input of a pulse signal, and if R-TIM equals or is longer than STOP-TIM, the process progresses to Step 234.

<Step 230>

Since it has been judged that the operation is still in the middle of focus driving, the lens controller 219 compares R-TIM and UP-TIM. UP-TIM indicates a period of continuity of a condition where the output signal from the pulse generator 224 does not change, which was determined in advance and has been stored in the memory 219a for preventing the speed from excessively lowering and resulting in stoppage even though the operation is in the middle of driving (not in the middle of stop processing).

If R-TIM is shorter than UP-TIM, the process returns to Step 215 and waits for an input of a pulse signal, and if it is equal to or longer than UP-TIM, the process progresses to Step 224 and executes speed-up processing.

<Step 231>

Since the remaining driving amount has reached 0 and the focusing lens 211 has reached the target position, the lens controller 219 applies braking (short-braking or reverse-braking) to the focus driving motor 221 to stop the focusing lens 211.

<Step 232>

The lens controller 219 reads in a voltage value outputted from the zoom brush 214, and judges whether or not the current position ZOOM of the zooming lens 212 is equal to or larger than a predetermined value. Herein, the predetermined value corresponds to a predetermined focal length, and the fact that the position of the zooming lens 212 is more than the predetermined position means that the focal length of the image-taking optical system is more on the telephoto side than the focal length corresponding to the abovementioned predetermined value. On the other hand, the fact that the position of the zooming lens 212 is smaller than the predetermined value means that the focal length of the image-taking optical system is more on the wide-angle side than the focal length corresponding to the predetermined value.

Then, the focal length corresponding to the predetermined value is required to be a value at which, even though the focusing lens 211 overruns the target position, a defocus amount on the image pickup surface due to the overrun does not exceed a permissible circle of confusion diameter.

When the current position ZOOM of the zooming lens 212 is larger (telephoto side) than the predetermined value, the process progresses to Step 233, and when the position is at the wide-angle side, the process progresses to Step 234.

<Step 233>

Since the position has been judged as being at the telephoto side at Step 232, the lens controller 219 sets a flag indicating that the operation is in the middle of stop processing, and the process returns to Step 215. From Step 215, the process progresses to Step 227, Step 228, and Step 229. Namely, when the focal length is on the telephoto side, as shown in FIG. 6(A), it is monitored whether or not a pulse signal is inputted from the pulse generator 224 (whether or not the output signal from the pulse generator 224 changes) while braking is applied to the focus driving motor 221, and it is confirmed that the focusing lens 211 does not overrun the target position. Then, in Step 229, if R-TIM is equal to or longer than STOP-TIM (shown as a stop judgement wait time in FIG. 6(A)), that is, if it has been confirmed that the focusing lens does not overrun the target position, the process progresses to Step 234.

If overrun occurs, the amount of overrun (pulse signals from the pulse generator 224) is counted and recognized, and based on this, it is judged whether or not the focus detection is carried out again.

<Step 234>

The lens controller 219 judges that the focusing lens 211 has stopped, and then executes drive stop processing. Therein, in a case where the process directly flows to Step 234 from Step 232 (the focal length is on the wide-angle side), a first stop judgement is carried out immediately by confirming that the remaining driving amount reaches 0 (the count value of pulse signals from the pulse generator 224 reaches the count value of the target pulse) as shown in FIG. 6(B). On the other hand, in a case where the process flows to Step 234 from Step 232 via Step 233 (Step 215, Step 227, Step 228, and Step 229), that is a case where the focal length is on the telephoto side, a second stop judgement is carried out by confirming that no pulse signal is inputted during the stop judgement wait time (STOP-TIM) after the remaining driving amount reaches 0 as shown in FIG. 6(A).

<Step 235>

The lens controller 219 resets an in-focus-driving flag that is one piece of information to be transmitted to the camera 201 side through lens status communications. By resetting this flag, the camera 201 side transfers to the next sequence in which it outputs a command to carry out focus detection to the lens 202 side again or carries out exposure operation (image-taking operation) of the image pickup device 205.

<Step 236>

The lens controller 219 ends this focus adjusting processing.

As described above, in this embodiment, the method for judging the drive stop of the focusing lens 211 is switched according to the focal length of the image-taking optical system, and at the telephoto side, stop position accuracy of the focusing lens 211 to the target position (in-focus position) is secured, and at the wide-angle side, the stop position accuracy is eased to quicken the drive stop and shorten the drive time of the focusing lens 211.

In this embodiment, one focal length is set for switching the stop judgement, however, it is also possible that stop judgement of the focusing lens can be more finely carried out by setting a plurality of focal lengths so that STOP-TIM for the stop judgement (second stop judgement) at the telephoto side differs depending on the focal length. Thus, by setting an optimal STOP-TIM for each focal length, the drive time can be shortened as much as possible while securing stop position accuracy required for each focal length.

(Embodiment 4)

Figure 9:
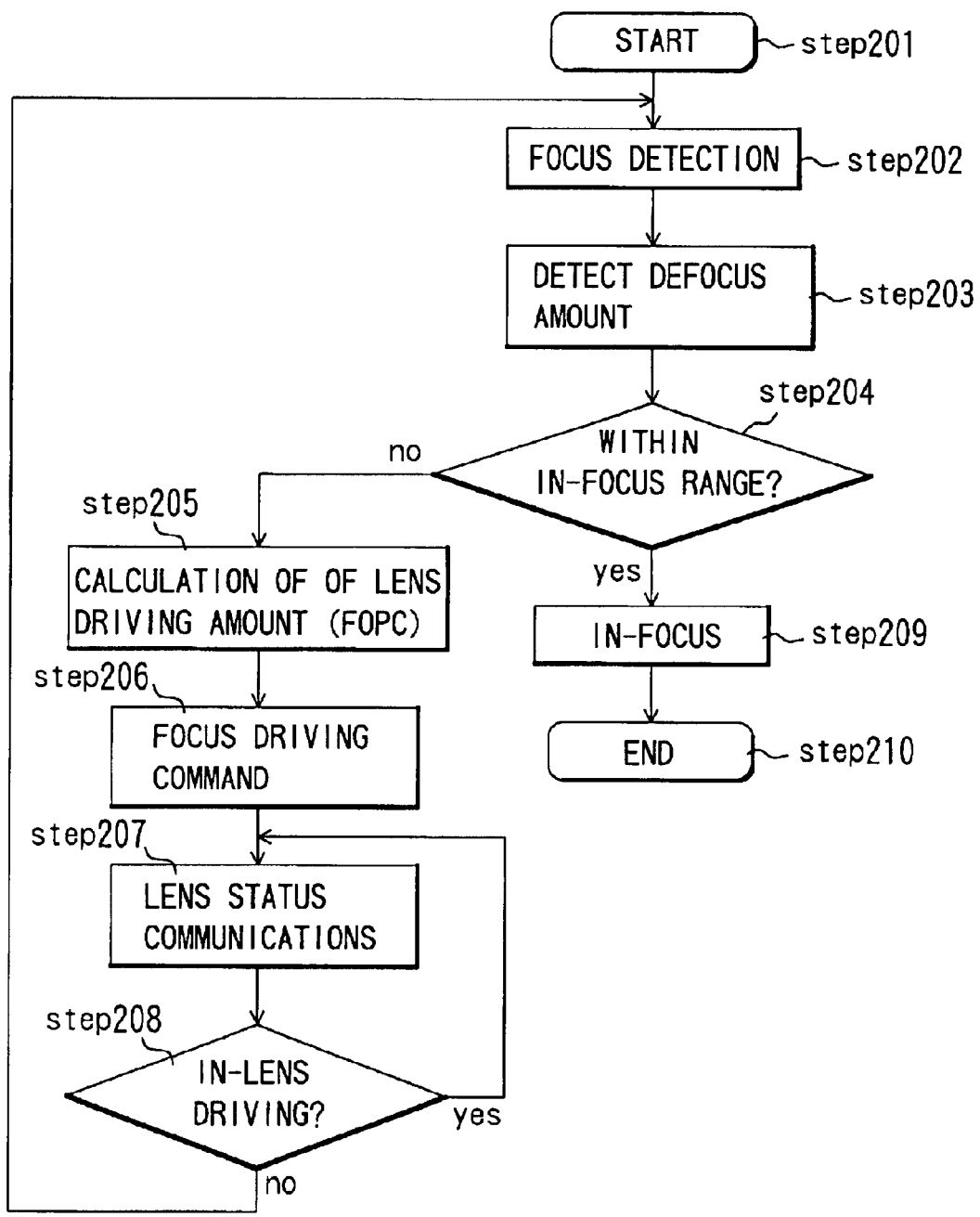
FIG. 9 is a flowchart describing processing operations of a camera forming the camera system of Embodiment 3.
Figure 10:
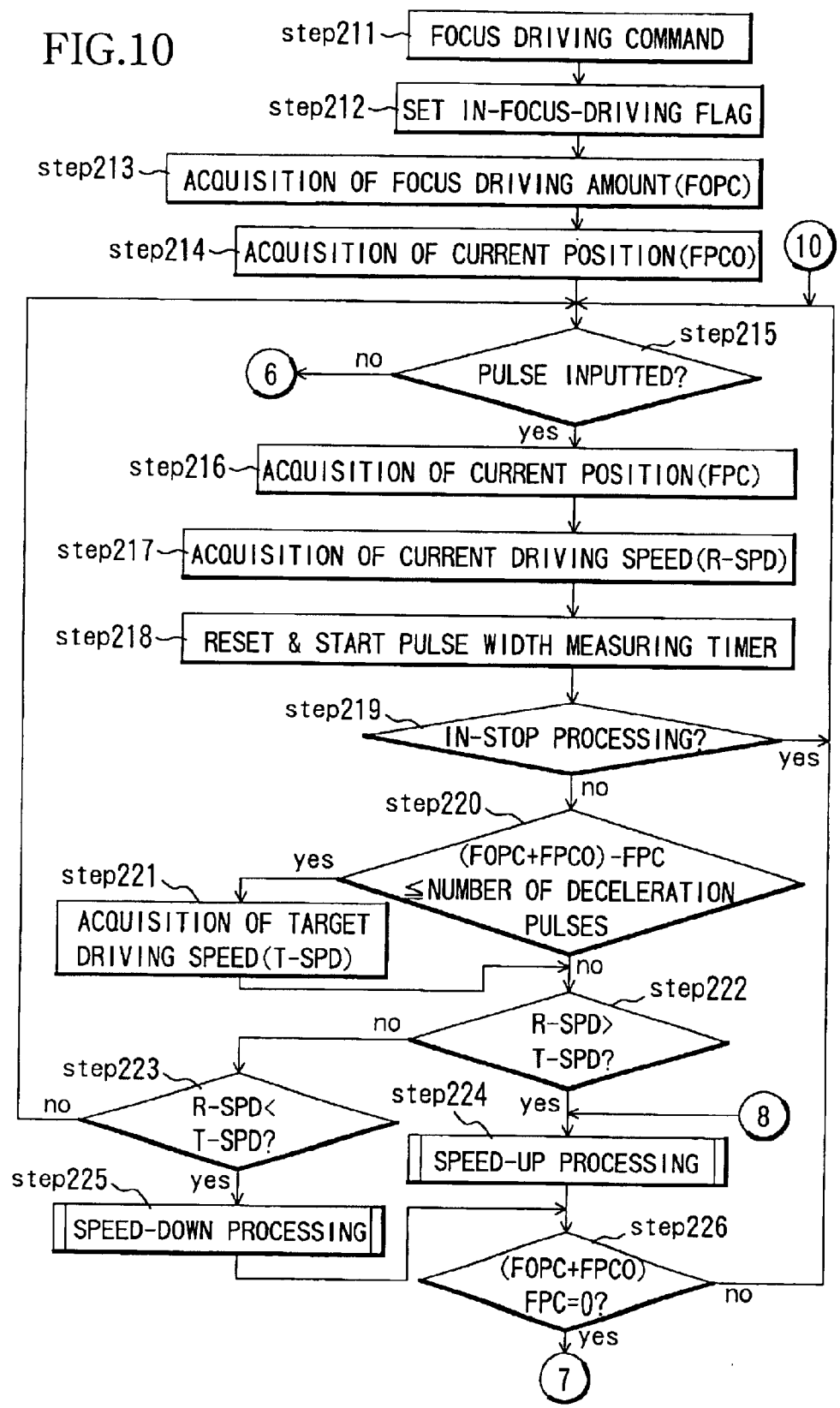
FIG. 10 is a flowchart describing processing operations of an image-taking lens forming the camera system of Embodiment 3.
Figure 11:
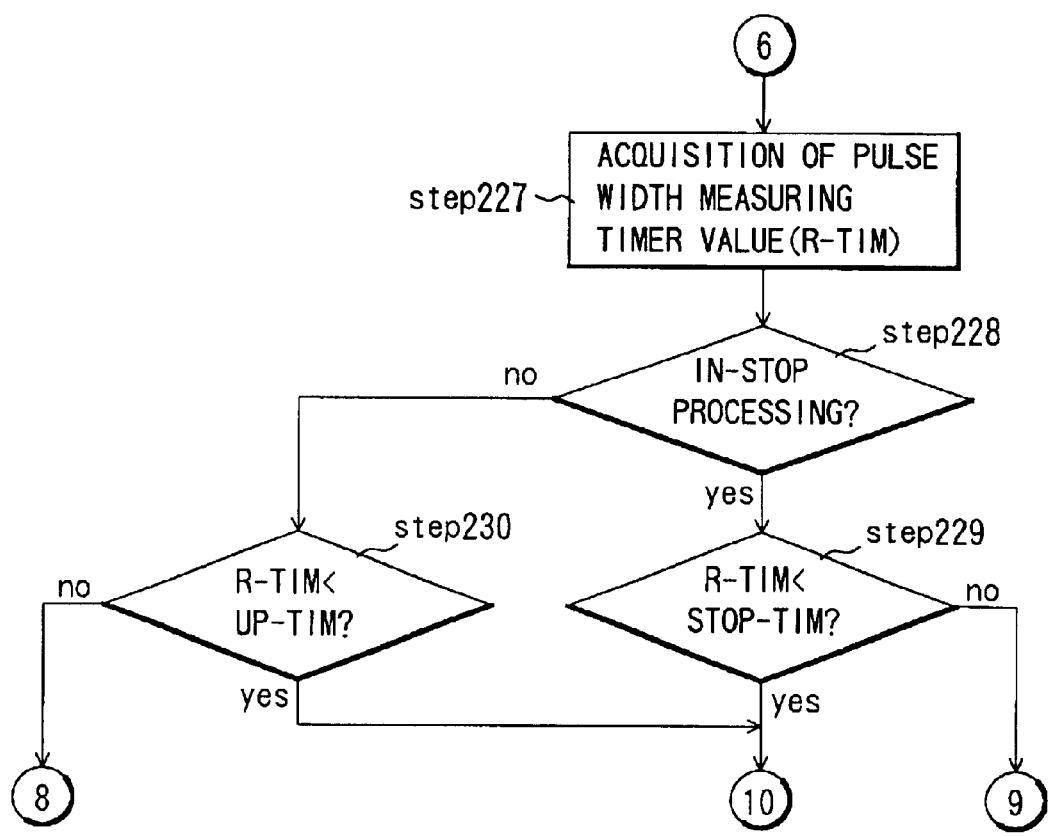
FIG. 11 is a flowchart describing processing operations of an image-taking lens of Embodiment 3.
Figure 12:
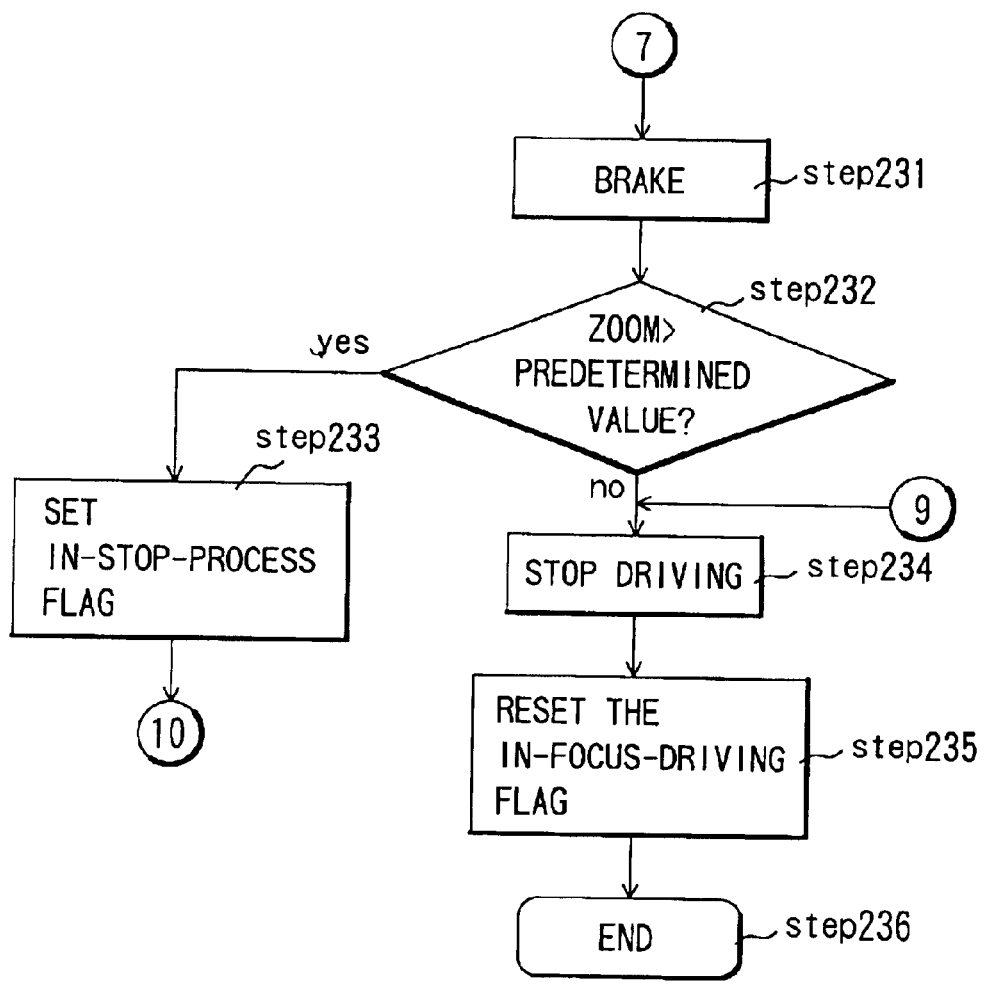
FIG. 12 is a flowchart describing processing operations of the image-taking lens of Embodiment 3.
Figure 13:
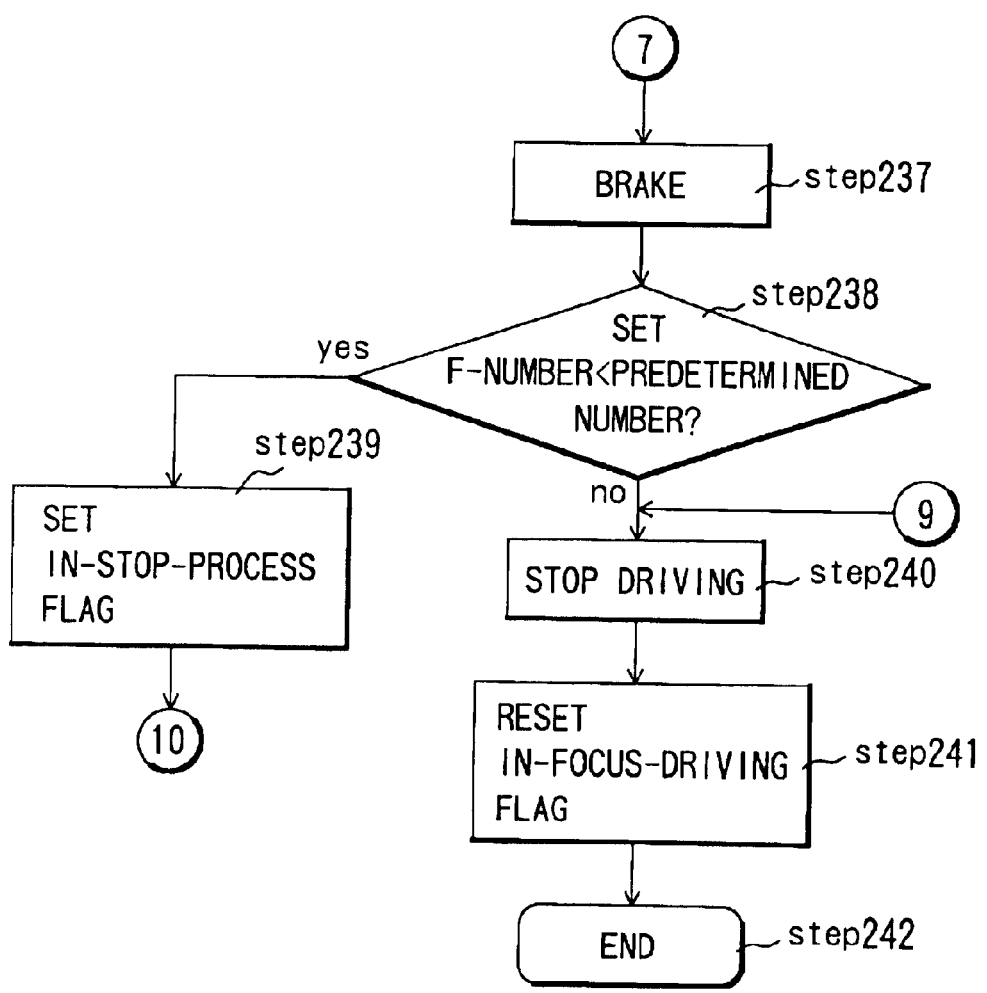
FIG. 13 is a flowchart describing processing operations of an image-taking lens forming a camera system of Embodiment 4 of the present invention.

Next, with reference to the flowcharts of FIG. 9 through FIG. 11 and FIG. 13, automatic focus adjusting operation in the camera system of Embodiment 4 of the present invention is described. Description of processings shown in FIG. 9 through FIG. 11 is omitted herein since it is aforementioned, and only the flowchart of FIG. 13 is described. Furthermore, portions attached with the same circled number in FIG. 9 through FIG. 11 and FIG. 13 are connected to each other.

Furthermore, the structure of the camera system to which this embodiment is applied is the same as that of the camera system described in Embodiment 3.

<Step 237>

Since the remaining driving amount has reached 0 and the focusing lens 211 has reached the target position at Step 226 in FIG. 10, the lens controller 219 applies braking (short-braking or reverse-braking) to the focus driving motor 221 to stop the focusing lens 211.

<Step 238>

The lens controller 219 reads in a current set value of the diaphragm 213 (hereinafter, referred to as a set F-number), and judges whether or not the set F-number is equal to or larger than a predetermined number. Herein, an F-number larger than the predetermined number indicates a condition where the aperture diameter of the diaphragm 213 is narrower than the aperture diameter corresponding to the predetermined number. Furthermore, an F-number smaller than the predetermined number indicates a condition where the aperture diameter of the diaphragm 213 is larger on the open side than the aperture diameter corresponding to the predetermined number. The F-number corresponding to the predetermined number is required to be a number at which, even when the focusing lens 211 overruns the target position, a defocus amount on the image pickup surface due to the overrun does not exceed a permissible circle of confusion diameter.

<Step 239>

When the set F-number is smaller (open side) than the predetermined number, the process progresses to Step 240, and when it is equal to or larger (narrowed side) than the predetermined number, the process progresses to Step 239.

Since it has been judged at Step 238 that the set F-number is at the open side, the lens controller 219 sets a flag indicating that the operation is in the middle of stop processing, and then the process returns to Step 215 in FIG. 10. From Step 215, the process progresses to Step 227, Step 228, and Step 229, and if R-TIM is equal to or longer than STOP-TIM at Step 229 (when it is confirmed that the focusing lens 211 has not overrun the target position), the process progresses to Step 240.

In a case of overrun, the amount of overrun is recognized by counting the amount (pulse signals from the pulse generator 224), and based on this, it is judged whether or not focus detection is carried out again.

<Step 240>

The lens controller 219 judges that the focusing lens 211 has stopped, and then executes drive stop processing. Herein, when the process directly flows to Step 240 from Step 238 (when the set F-number is equal to or larger than the predetermined number and is at the narrowed side), a first stop judgement is carried out immediately when the remaining driving amount reaches 0 (the count value of pulse signals from the pulse generator 224 reaches the count value of the target pulse) as in the case where the focal length is on the wide-angle side as shown in FIG. 6(B). On the other hand, when the process flows to Step 240 via Step 239 (Step 215, Step 227, Step 228, and Step 229) to Step 238 (that is, when the set F-number is smaller than the predetermined number), a second stop judgment is carried out by confirming that no pulse signal is inputted during the stop judgement wait time (STOP-TIM) after the remaining driving amount reaches 0 as in the case where the focal length is on the telephoto side shown in FIG. 6(A).

<Step 241>

The lens controller 219 resets an in-focus-driving flag that is one piece of information to be transmitted to the camera 201 side by means of lens status communications. By resetting this flag, the camera 201 side transfers to the next sequence in which it outputs a command to carry out focus detection again to the lens 202 side or carries out exposure (image-taking) of the image pickup device 205.

<Step 242>

The lens controller 219 ends this focus adjusting processing.

As described above, in this embodiment, the method for judging drive stop of the focusing lens 211 is switched based on the set value of the diaphragm 213, and at the diaphragm open side, stop position accuracy of the focusing lens 211 to the target position (in-focus position) is secured, and at the narrowed side, the stop position accuracy is eased to quicken drive stop and shorten the drive time of the focusing lens 211.

In this embodiment, one value of the diaphragm is set for switching stop judgement, however, it is also possible that the stop of the focusing lens is more finely judged by setting a plurality of values of the diaphragm so that STOP-TIM to be used for stop judgement (second stop judgement) at the open side differs depending on the value of the diaphragm. Thus, by setting an optimal STOP-TIM for each value of the diaphragm, the drive time can be shortened as much as possible while securing stop position accuracy required for each set value of the diaphragm.

In the abovementioned Embodiments 3 and 4, a digital camera having the image pickup device 205 is described, however, the present invention can also be applied to a camera which exposes a film.

As described above, in each embodiment, according to the first stop judgement, a period until a stop judgement is obtained (a period to the end of the drive sequence of the focusing lens) can be shortened although the stop position accuracy of the focusing lens is eased. On the other hand, according to the second stop judgement, high stop position accuracy of the focusing lens can be maintained.

By using these judgement methods appropriately depending on the status of the image-taking optical system, for example, by carrying out the first stop judgement in a condition where the focal depth is deep such as cases where the lens is at the wide-angle side and the diaphragm is narrowed, and carrying out the second stop judgement in a condition where the focal depth is shallow such as cases where the lens is at the telephoto side and the diaphragm is set to the open side, the drive time of the focusing lens can be shortened or required stop position accuracy (that is, focusing accuracy) can be secured in accordance with the status of the image-taking optical system.

While preferred embodiments have been described, it is to be understood that modification and variation of the present invention may be made without departing from scope of the following claims.

What is claimed is:

1. A camera comprising:
   an image-taking optical system which includes a focusing lens that is movable in an optical axis direction to carry out focusing,
   a drive unit which drives the focusing lens to a target position,
   a pulse generator which outputs pulse signals in accordance with movement of the focusing lens, and
   a stop judging unit which judges that the focusing lens has stopped at the target position based on pulse signals from the pulse generator,
   wherein the stop judging unit judges the status of the image-taking optical system, and
   selectively carries out, depending on the detected status of the image-taking optical system, a first stop judgement in which it is judged that the focusing lens has stopped at the target position by detecting that the count value of pulse signals from the pulse generator has reached a count value corresponding to the target position, and a second stop judgement in which it is judged that the focusing lens has stopped at the target position by detecting that the output signal from the pulse generator does not change for a predetermined period or more.

2. The camera according to claim 1, wherein
   the stop judging unit detects the focal length of the image-taking optical system as the status of the image-taking optical system, and
   carries out the first stop judgement when the focal length of the image-taking optical system is closer to the wide-angle side than a predetermined focal length, and carries out the second stop judgement when the focal length of the image-taking optical system is closer to the telephoto side than the predetermined focal length.

3. The camera according to claim 1, wherein
   the image-taking optical system includes a stop, and
   the stop judging unit detects a set value of the stop as the status of the image-taking optical system, and carries out the first stop judgement when the set value of the stop is closer to the narrowed side than a predetermined value, and carries out the second stop judgement when the set value of the stop is closer to the open side than the predetermined value.

4. The camera according to claim 1, wherein
   in the second stop judgement, the predetermined period differs depending on the status of the image-taking optical system.

5. A lens apparatus which is attachable to a camera, comprising:
   an image-taking optical system which includes a focusing lens that is movable in an optical axis direction to carry out focusing,
   a drive unit which drives the focusing lens to a target position,
   a pulse generator which outputs pulse signals in accordance with movement of the focusing lens, and
   a stop judging means which judges that the focusing lens has stopped at the target position based on pulse signals from the pulse generator,
   wherein the stop judging unit detects the status of the image-taking optical system, and
   selectively carries out, depending on the detected status of the image-taking optical system, a first stop judgement that the focusing lens has stopped at the target position by detecting that the count value of pulse signals from the pulse generator has reached a count value corresponding to the target position, and a second stop judgement that the focusing lens has stopped at the target position by detecting that the output signal from the pulse generator does not change for a predetermined period or more.

6. The lens apparatus according to claim 5, wherein
   the stop judging unit detects the focal length of the image-taking optical system as the status of the image-taking optical system, and
   carries out the first stop judgement when the focal length of the image-taking optical system is closer to the wide-angle side than a predetermined focal length, and carries out the second stop judgement when the focal length of the image-taking optical system is closer to the telephoto side than the predetermined focal length.

7. The lens apparatus according to claim 5, wherein the image-taking optical system includes a stop, the stop judging unit detects a set value of the stop as the status of the image-taking optical system, and carries out the first stop judgement when the set value of the stop is closer to the narrowed side than a predetermined value, and carries out the second stop judgement when the set value of the stop is closer to the open side than the predetermined value.

8. The lens apparatus according to claim 5, wherein the stop judging unit transmits a signal indicating that the focusing lens is being stopped to the camera when the stop judgement is carried out.

9. The lens apparatus according to claim 5, wherein in the second stop judgement, the predetermined period differs depending on the status of the image-taking optical system.

10. A camera system comprising:

a lens apparatus according to claim 5, and a camera to which the lens apparatus is attachable.

11. A camera comprising:

an image-taking optical system which includes a focus unit movable in an optical axis direction;

a target position setting unit which sets a target position of the focusing unit to be moved;

a direct unit which drives the focusing unit;

a counter which counts pulse signals generated in accordance with the movement of the focusing unit;

a status detecting unit which detects the status of the image-taking optical system; and a controller which controls the drive unit to stop at the following times selected on the basis of the status detected by said status detecting unit: when the counted pulses indicate the target position or when the counted pulses do not change for a predetermined period.

12. A lens apparatus attachable to a camera comprising:

an image-taking optical system which includes a focusing unit movable in an optical axis direction;

a drive unit which drives the focusing unit to a target position;

a counter which counts pulse signals generated in accordance with the movement of the focusing unit;

a status detecting unit which detects the status of the image-taking optical system; and a controller which controls the drive unit to stop at one of the following times selected on the basis of the status detected by said status detecting unit: when the counted pulses indicate the target position or when the counted pulses do not change for a predetermined period.

13. A camera comprising:

an image-taking optical system which includes a focusing unit movable in an optical axis direction;

a target position setting unit which sets a target position of the focusing unit to be moved;

a drive unit which drives the focusing unit;

a position detecting unit which detects the position of the focusing unit;

a status detecting unit which detects the status of the image-taking optical system; and a controller which controls the drive unit to stop at one of the following times selected on the basis of the status detected by said status detecting unit: when the position detecting unit detects the target position or when the detected position does not change for a predetermined period.

14. A lens apparatus attachable to a camera, comprising:

an image-taking optical system which includes a focusing unit movable in an optical axis direction;

a drive unit which drives the focusing unit to a target position;

a position detecting unit which detects the position of the focusing unit;

a status detecting unit which detects the status of the image-taking optical system; and a controller which controls the drive unit to stop at one of the following times seleceted on the basis of the status detected by said status detecting unit: when the position detecting unit detects the target position or when the detected position does not change for a predetermined period.

15. The camera according to claim 11, wherein the image-taking optical system further comprises a zoom lens unit; and the status of the image-taking optical system represents the position of the zoom lens unit.

16. The camera according to claim 11, wherein the image-taking optical system further comprises a stop unit; and the status of the image-taking optical system represents the aperture value of the stop unit.

17. The lens apparatus according to claim 12, wherein the image-taking optical system further comprises a zoom lens unit; and the status of the image-taking optical system represents the position of the zoom lens unit.

18. The lens apparatus according to claim 12, wherein the image-taking optical system further comprises a stop unit; and the status of the image-taking optical system represents the aperture value of the stop unit.

19. The camera according to claim 13, wherein the image-taking optical system further comprises a zoom lens unit; and the status of the image-taking optical system represents the position of the zoom lens unit.

20. The camera according to claim 13, wherein the image-taking optical system further comprises a stop unit; and the status of the image-taking optical system represents the aperture value of the stop unit.

21. The lens apparatus according to claim 14, wherein the image-taking optical system further comprises a zoom lens unit; and the status of the image-taking optical system represents the position of the zoom lens unit.

22. The lens apparatus according to claim 14, wherein the image-taking optical system further comprises a stop unit; and the status of the image-taking optical system represents the aperture value of the stop unit.

* * * * *

UNITED STATES PATENT AND TRADEMARK OFFICE
CERTIFICATE OF CORRECTION

PATENT NO. : 6,856,764 B2  Page 1 of 1
DATED : February 15, 2005
INVENTOR(S) : Kazuya Higuma It is certified that error appears in the above-identified patent and that said Letters Patent is hereby corrected as shown below:

Column 20,
Line 17, delete "seleceted" and insert -- selected --.

Signed and Sealed this

Tenth Day of May, 2005

JON W. DUDAS
*Director of the United States Patent and Trademark Office*